US012462261B2

(12) United States Patent
Sidhu et al.

(10) Patent No.: US 12,462,261 B2
(45) Date of Patent: Nov. 4, 2025

(54) OPTIMIZING CARBON EMISSIONS FROM STREAMING PLATFORMS WITH ARTIFICIAL INTELLIGENCE BASED MODEL

(71) Applicant: INTERNATIONAL BUSINESS MACHINES CORPORATION, Armonk, NY (US)

(72) Inventors: Divgian Sidhu, Mohali (IN); Ayush Jain, Lucknow (IN); Smitkumar Narotambhai Marvaniya, Bangalore (IN); Sujoy Kumar Roy Chowdhury, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 266 days.

(21) Appl. No.: 17/406,722

(22) Filed: Aug. 19, 2021

(65) Prior Publication Data
US 2023/0059038 A1  Feb. 23, 2023

(51) Int. Cl.
*H04N 21/2343* (2011.01)
*G06F 11/34* (2006.01)
(Continued)

(52) U.S. Cl.
CPC ....... *G06Q 30/018* (2013.01); *G06F 11/3428* (2013.01); *G06Q 30/0282* (2013.01); *H04N 21/2343* (2013.01)

(58) Field of Classification Search
CPC .............. G06Q 30/018; G06Q 30/0282; G06F 11/3428; H04N 21/2343; Y02P 90/84
See application file for complete search history.

(56) References Cited

U.S. PATENT DOCUMENTS 9,324,375 B1   4/2016 Casalena et al.
10,432,970 B1  10/2019 Phillips et al.
(Continued)

FOREIGN PATENT DOCUMENTS

EP   2763421 A1   8/2014

OTHER PUBLICATIONS

Apple Support, "Download and stream shows, movies, and events from Apple TV+, MLS Season Pass, and Apple TV channels" Apple, published on Aug. 13, 2021, https://web.archive.org/web/20210813011808/https://support.apple.com/en-us/HT210074 (Year: 2021).*

(Continued)

*Primary Examiner* — Wenren Chen
(74) *Attorney, Agent, or Firm* — Tutunjian & Bitetto, P.C.; Michael A. Petrocelli

(57) ABSTRACT

Media is streamed in accordance with carbon footprint considerations. A streaming history of a streaming plan is analyzed to determine a historical carbon footprint. At least one streaming plan is presented that includes target carbon footprint relative to the historical carbon footprint. A selection is received for one of the at least one streaming plan, wherein the streaming performance on the streaming plan is tracked for post streaming plan carbon emissions. The user streaming performance is modified for the post streaming plan carbon emissions to substantially match the target carbon footprint of the at least one streaming plan.

18 Claims, 13 Drawing Sheets

(51) Int. Cl.
    *G06Q 30/018*    (2023.01)
    *G06Q 30/0282*    (2023.01)

(56) References Cited

U.S. PATENT DOCUMENTS

| | | | | |
|---|---|---|---|---|
| 2011/0314095 | A1* | 12/2011 | Gupta | H04N 21/44012 |
| | | | | 709/203 |
| 2012/0117149 | A1 | 5/2012 | Nagpal et al. | |
| 2012/0203886 | A1 | 8/2012 | Mavromatis | |
| 2013/0184879 | A1 | 7/2013 | Xia et al. | |
| 2018/0191868 | A1 | 7/2018 | Wang et al. | |
| 2019/0090001 | A1* | 3/2019 | Smith | H04N 21/8456 |
| 2019/0213097 | A1* | 7/2019 | Jin | G06Q 10/00 |

OTHER PUBLICATIONS

Carbon Trust, "Carbon impact of video streaming", published on Jun. 11, 2021, https://www.carbontrust.com/our-work-and-impact/guides-reports-and-tools/carbon-impact-of-video-streaming, (Year: 2021).*

O. Ejembi and S. N. Bhatti, "Client-Side Energy Costs of Video Streaming," 2015 IEEE International Conference on Data Science and Data Intensive Systems, Sydney, NSW, Australia, 2015, pp. 252-259, doi: 10.1109/DSDIS.2015.49. (Year: 2015).*

Benjaafar, Saif, et al., "Carbon footprint and the management of supply chains: Insights from simple models," IEEE transactions on automation science and engineering, Jul. 2012, 37 pages, 10.1.

Mell, Peter, et al., "The NIST Definition of Cloud Computing," Sep. 2011, 7 pages.

Anonyomous, "Does Binge Watching Leave a Carbon Footprint?—Reduce Emissions," https://www.terrapass.com/blog/does-binge-watching-leave-a-carbon-footprint, Jun. 2021, 5 pages.

Anonyomous, "Does online video streaming harm the environment?—saveonenergy.com," https://www.saveonenergy.com/uk/does-online-video-streaming-harm-the-environment/, Jun. 2021, 4 pages.

Anonyomous, "German study highlights carbon footprint of video streaming," https://www.deccanherald.com/International/german-study-highlights-carbon-footprint-of-video-streaming-885479.html, Sep. 2020, 4 pages.

St. John, Jeff, "Google Tests Load-Shifting at Data Centers to Capture the Grid's Peak Clean Energy Hours," https://www.greentechmedia.com/articles/read/google-tests-shifting-data-center-loads-to-capture-grids-clean-energy, Apr. 2020, 3 pages.

Anonyomous, "National Grid Carbon Intensity Forecast," https://electricityinfo.org/forecast-carbon-intensity/, Jun. 2021, 2 pages.

Carleton, Audrey, "How to lower your digital carbon footprint," https://blog.arcadia.com/internet-carbon-footprint/, Mar. 2020, 6 pages.

Anonyomous, "Predictive Carbon Footprint Management of Devices," https://ip.com/IPCOM/000258746, Jun. 2019, 6 pages.

Kamiya, George, "The carbon footprint of streaming video: fact-checking the headlines," https://www.iea.org/commentaries/the-carbon-footprint-of-streaming-video-fact-checking-the-headlines, Dec. 2020, 11 pages.

Chandaria, Jigna, et al., "The carbon footprint of watching television, comparing digital terrestrial television with video-on-demand," Proceedings of the 2011 IEEE International Symposium on Sustainable Systems and Technology, EEE, May 2011, pp. 1-6.

Hamill, Jasper, "Your Netflix binge-watching is pollution the planet, documentary claims," https://metro.co.uk/2020/03/09/binge-watching-netflix-12370377/, Mar. 2020, 3 pages.

Ng, Yan Bin, et al., "Forecasting future action sequences with attention: a new approach to weakly supervised action forecasting," IEEE Transactions on Image Processing, Sep. 2020, 13 pages, 29.

* cited by examiner

OPTIMIZING CARBON EMISSIONS FROM STREAMING PLATFORMS WITH ARTIFICIAL INTELLIGENCE BASED MODEL

BACKGROUND

The present disclosure relates to managing streaming platforms and services, and more particularly to managing streaming platforms considering carbon emissions.

Streaming high-definition videos and games can result in measurable greenhouse gas emissions. That is because these services are associated with energy use and carbon emissions from devices, data centers, and network infrastructure. In theory, the amount of energy needed to stream video content and play games is small. Collectively speaking, it adds up, especially when one also considers the greenhouse gases that are emitted. Growing trends in technology are also making a collective difference. The consumption of streaming media is also growing rapidly worldwide. TV streaming subscriptions are increasing over traditional cable. Video traffic over mobile networks is growing with the increases in television/video streaming subscriptions. Due to the rise in popularity of streaming content, video-streaming and cloud-gaming services have also increased. In some parts of the world, data centers are still largely powered from the burning of fossil fuels. In some instances, at the individual level, streaming video over fiber optic cables results in the lowest amount of $CO_2$ emissions, at the rate of two grams per hour. However, streaming over the upcoming generations of mobile technology, better known as 5G, can result in carbon dioxide emissions of five grams per hour.

SUMMARY

In one embodiment, the present disclosure provides a method of providing streaming media consumers carbon emission aware plans. In one embodiment, the method is a computer implemented method that includes analyzing a streaming history of a streaming to determine a historical carbon footprint. In a following step, at last one stream plan is provided, each of the at least one streaming plan includes target carbon footprint relative to the historical carbon footprint. The user selects one of said at least one streaming plan, wherein the streaming performance on the streaming plan is tracked for post streaming plan carbon emissions. The streaming performance is modified for the post streaming plan carbon emissions to substantially match the target carbon footprint.

In another embodiment, a system is provided for managing streaming media consumers carbon emission aware plans. In one embodiment, the system includes a hardware processor; and a memory that stores a computer program product. The computer program product including instructions that which, when executed by the hardware processor, causes the hardware processor to analyze a streaming history of a streaming plan to determine a historical carbon footprint. In a following step, the system can provide at last one stream plan. Each of the at least one streaming plan includes target carbon footprint relative to the historical carbon footprint. The system receives a selected streaming plan from a user, wherein the system tracks the streaming performance on the streaming plan for post streaming plan carbon emissions. The system modifies the user streaming performance for the post streaming plan carbon emissions to substantially match the target carbon footprint of the at least one streaming plan.

In yet another embodiment, a computer program product is provided for managing streaming media consumers carbon emission aware plans. The computer program product includes a computer readable storage medium having computer readable program code embodied therewith. The program instructions executable by a processor to cause the processor to analyze, using the processor, a streaming history of a streaming plan to determine a historical carbon footprint. In a following step, the computer program product can provide at last one stream plan. Each of the at least one streaming plan includes target carbon footprint relative to the historical carbon footprint. The program instructions executable by the processor to cause the processor to receive a selected streaming plan from the user, wherein the system tracks the streaming performance on the streaming plan for post streaming plan carbon emissions. The program instructions executable by the processor also cause the processor to modify, using the processor, the user streaming performance for the post streaming plan carbon emissions to substantially match the target carbon footprint of the at least one streaming plan.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION

Figure 1:
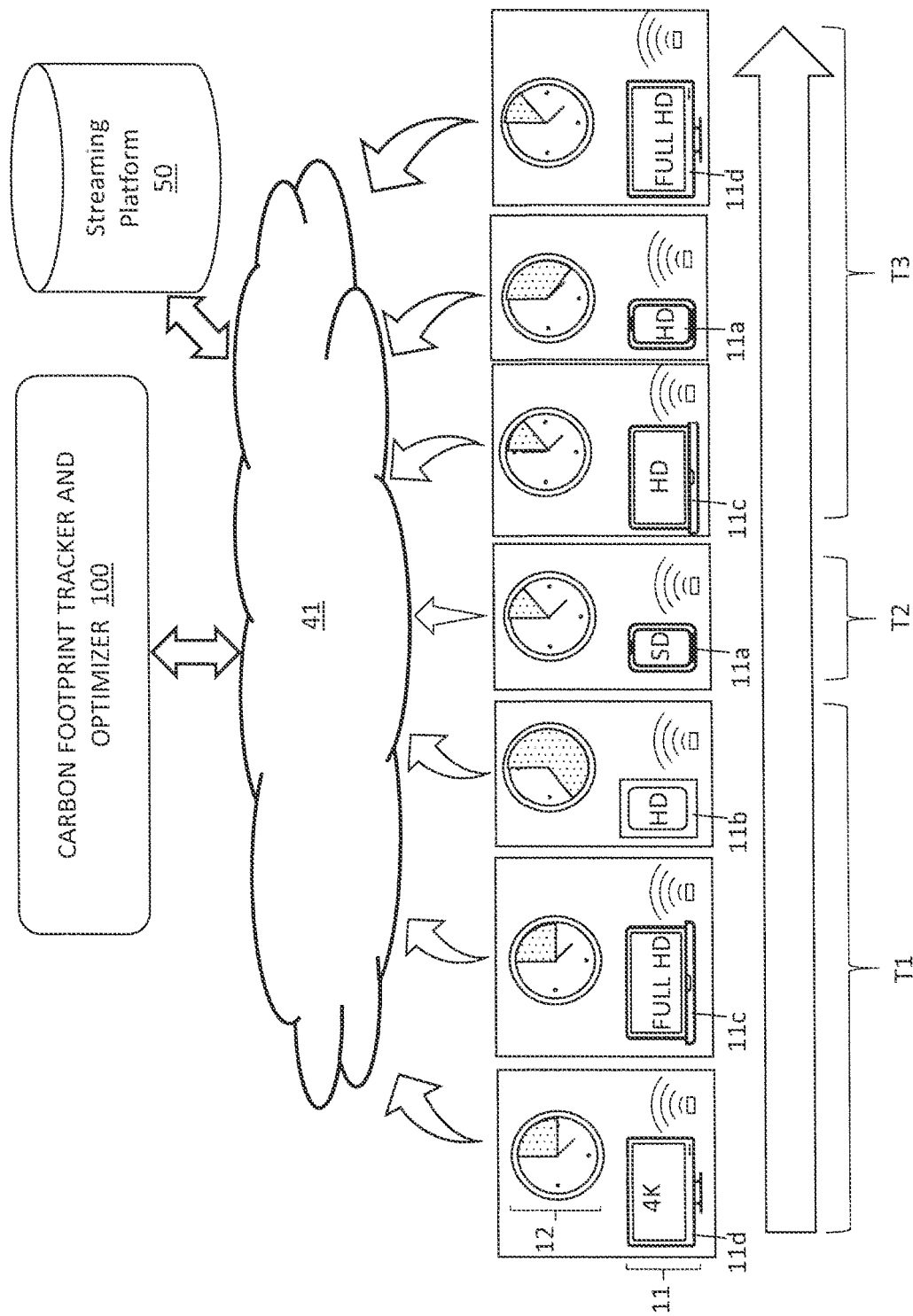
FIG. 1 is a diagram illustrating an exemplary environment, in which systems, methods and computer program products are employed to track and optimize carbon emissions from online streaming platforms, in accordance with one embodiment of the present disclosure.

The present disclosure provides methods, systems and computer program products that provide for carbon aware streaming plans. Prior to the methods, systems and computer program products of the present disclosure, video recommendation systems did not consider the carbon footprint of the streaming services. Trial approaches to reducing carbon footprint, such as reducing the quality for the entirety of the streaming content to lower qualities, are not acceptable as they adversely impact the user experience. In some embodiments, the methods, systems and computer program products of the present disclosure recommend carbon aware streaming plans, and help in optimizing the carbon emissions of a user for viewing online videos and restricting the emissions within a set limit, while maintaining the user experience. The methods, systems and computer program products described herein can not only track carbon emission for online streaming, but also provides optimization of the streaming process to reduce the carbon footprint. Further, the methods, systems and computer program products focus on the user space for streaming within a data center, which is distinguishable from methods that focus on the efficiency of the data center.

The methods, systems and computer program products described herein can track the carbon footprint of a user employing the streaming services provided in watching videos, and can provide ways to the user's recommendations on how the user can reduce their carbon emissions in using their streaming services. The systems track the "carbon balance" of a user and can dynamically calculate the carbon footprint, while taking into account factors, such as the quality of streaming, the device used for streaming, and the duration of streaming for the media. The system can generate recommendations to the user taking into account their personalized usage of streaming media. Taking into account the user's usage requirements, the methods, systems and computer program products can provide a personalized streaming experience that maintains a high quality video stream while reducing the carbon footprint to a level considered acceptable by the user. Updates can be performed dynamically providing for a particular user taking into account the user's streaming performance, e.g., quality of streaming, types of devices on which streaming content is being viewed, and the typical duration for a user streaming media. Using this information the systems can provide a plan for a user to maximize their streaming experience while reducing their carbon footprint.

In some embodiments, the system can analyze the user's historical video streaming patterns, and from that analysis can recommend a carbon-aware streaming model. In some embodiments, the systems and computer program products described herein can allow the user to select carbon aware video streaming to maximize their user experience while satisfying carbon limits. The methods, systems and structures of the present disclosure are now described with reference to FIGS. 1-13.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a diagram illustrating an exemplary environment, in which systems, methods and computer program products are employed to track and optimize carbon emissions from online streaming platforms. The methods and systems described herein analyze a user's historical video streaming patterns, and recommends carbon-aware video streaming plans, and dynamically optimizes the video streaming content to satisfy the recommended carbon-aware plans using multi-objective optimization. In some embodiments, the methods and systems described herein can optimize pre-recorded content based on required system configuration while maximizing the user experience. In some embodiments, the methods and systems described herein can forecast the activities in a live video and estimate the required system configuration for optimal experience.

FIG. 1 represents a timeline illustrating a historical streaming portion identified by T1; a streaming plan with carbon consideration offer period T2; and a streaming monitoring period T3.

The systems, methods and computer program products can perform carbon-aware video streaming plan recommendations by analyzing historical user's streaming patterns during the historical streaming portion T1 of the timeline depicted in FIG. 1. The system 100 for optimizing carbon emissions from online streaming platforms can analyze streaming patterns of a user that registers with the system and provides permission for the system to have access to the user's historical streaming data. The system 100 may be in communication with a streaming service provider 50, i.e., a party that provides streaming content to the users. The system 100 may be in communication with the user with the system 100 through a network 41 that can be provided through the internet.

For example, the system 100 for optimizing carbon emissions from online streaming platforms can analyze streaming patterns of the user that can include data for the device type 11, streaming time 12, video content resolution, as well as the network type that is employed in streaming the content to the user. In one example, the types of devices 11 used by the user for streaming media can include mobile devices, such as phones (e.g., smart phones 11a), tablets 11b, and laptop computers 11c, etc. The type of devices 11 that may be considered by the system 100 for optimizing carbon emissions from online streaming platforms may also include more stationary types of devices, such as televisions, e.g., smart tv's 11d, and/or desktop computers.

The streaming time 12 of the user is the time for which online videos are being streamed. It is noted that the methods, systems and computer program products described herein are not limited to only pre-recorded video. The streaming may also be streaming of real time media, which can include streaming of video game content.

The user's data that may be analyzed by the system 100 for optimizing carbon emissions from online streaming platforms 50 may also be the video content resolution for the media files being observed by the user during the user's streaming. For example, the video content resolution may be standard definition (SD) quality, high definition (HD) quality and/or full high definition (HD) quality. For high definition (HD) and full high definition (HD) quality, the quality for the definition can include 720p, 1080p, 4K, etc.

Figure 2:
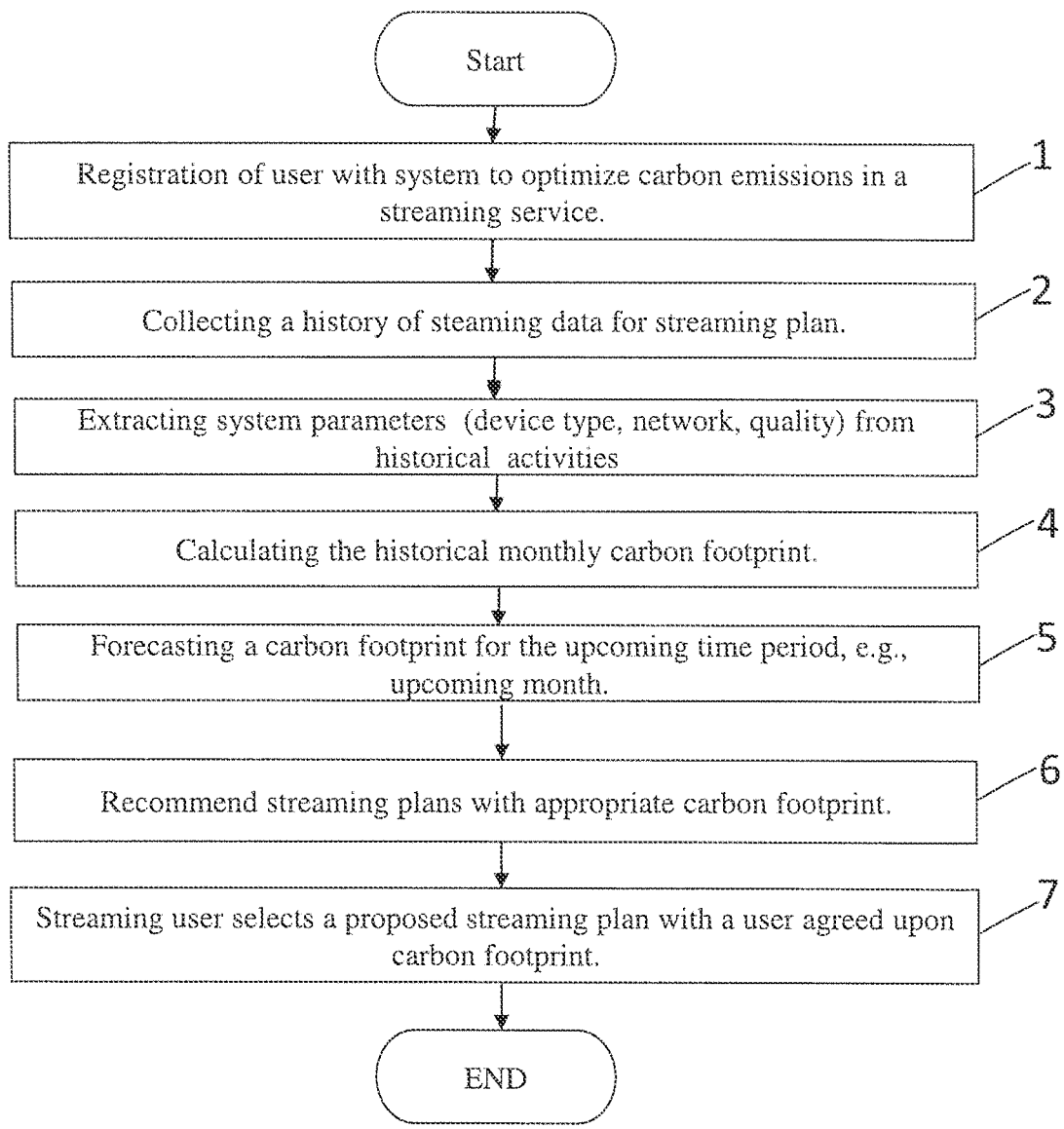
FIG. 2 is a flow chart/block diagram illustrating a method that tracks and optimize carbon emissions from online streaming platforms to provide users with carbon aware streaming plans, in accordance with one embodiment of the present disclosure.

FIG. 2 is a flow chart/block diagram illustrating a method that tracks and optimize carbon emissions from online streaming platforms to provide users with carbon aware streaming plans. Referring to block 1 of the method depicted in FIG. 1, the method may begin with, in response to receiving permission from a user for data collection, registering users with the system 100 for optimizing carbon emissions from online streaming platforms. In some embodiments, the registration at block 1 can be performed once during the time at which the user registers for service with the streaming service provider 50, such as during installation of a program product implementing the streaming service, or at the first usage of the streaming service.

To the extent that implementations of the system 100 for optimizing carbon emissions from online streaming platforms 50 collect, store, or employ personal information provided by, or obtained from, individuals (for example, current locations of the user, historical word usage, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Figure 3:
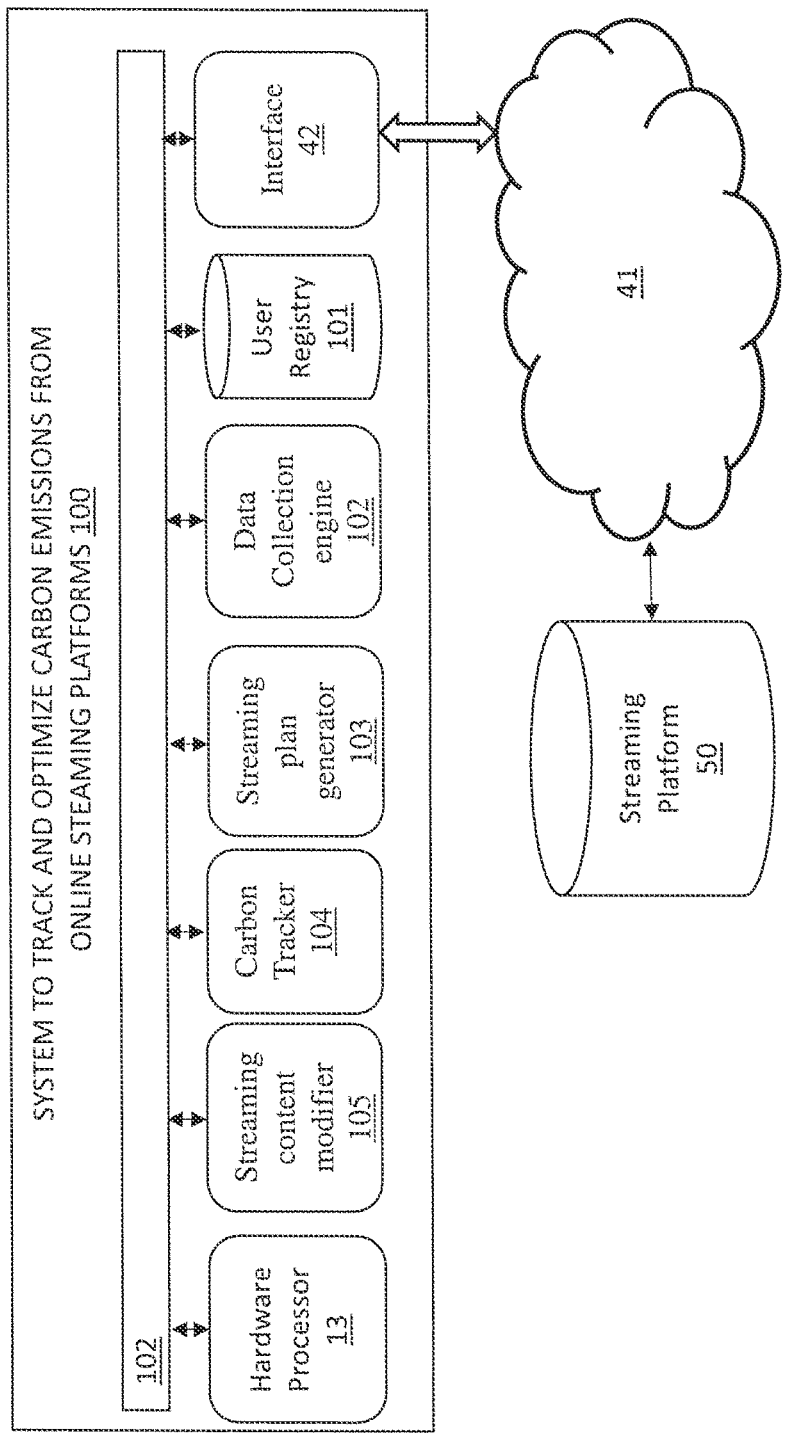
FIG. 3 is a block diagram illustrating a system that provides carbon aware streaming plans by analyzing historical streaming patterns, in accordance with one embodiment of the present disclosure.

FIG. 3 illustrates a system that provides carbon aware streaming plans by analyzing a user's historical streaming patterns. The system may include a registry 101 for users. The registry 101 includes an interface for receiving permissions for user's from the streaming service providers 50, as well as at least one form of memory for maintaining a database of registry information including what permissions have been granted and withdrawn.

Referring to block 2 of the method depicted in FIG. 2, the method may continued with collecting a history of streaming data corresponding to the user (users) 10 that are using the streaming services provided by the streaming service provider 50. The data taken from the users is used to measure a baseline carbon footprint for a user that is viewing streaming content from the streaming service providers 50. As noted, the quality of the streaming content, duration of streaming content, time at which the streaming content is being viewed, device type on which the streaming content is being displayed, and the number of different devices being used by the user to view the streamed content all impact the carbon emissions of the streaming events by the user. All of this information, can be determined from the history of streaming viewing by the user with the streaming service providers, as well as the user's designated streaming settings. For example, the streaming service providers 50 may have records of the types of streaming media that a user has watched, the duration at which the user 10 watches streamed media, and the time periods in which a user is active for using the streaming services. When the user provides permission to allow the system 100 to access their data for the purposes of calculating carbon footprint, the streaming service provider 50 can provide the historical data to the system 100 to perform the analysis. In some embodiments, data regarding what types of devices and how many devices are employed in streaming by the user may be recorded when the user configures their streaming account with the streaming service provider 50.

Referring to FIG. 3, in some embodiments the collection of data may be across a data collection engine 102. The data collection engine 102 may include a data collection interface that is in communication with streaming service providers, and data collection memory. The data collection memory may include at least one type of memory, which can store the data regarding the user's historical streaming usage for analysis by the system 100.

The method may continue with extracting system parameters, e.g., device, network and/or quality, from the data collected from the users, i.e., the data corresponding to the historical user activities, and calculating from the data a value correlating to a historical carbon footprint for the user. More specifically, block 3 of the method illustrated in FIG. 2 includes calculating the historical monthly carbon footprint of the user. Calculating the historical monthly carbon footprint may include a calculation that considers as inputs each of the elements described above that impact carbon emissions with streaming, such as quality of the streaming content, e.g., standard definition, 720p. 1080p, etc. The historical monthly carbon footprint may be an average that is extrapolated into a monthly value from a shorter time period. For example, the streaming data extracted from the user may be from time periods of two weeks or less for usage of the streaming service from the streaming service provider 50. That data can be sufficient to provide a monthly estimate.

Referring to block 4 of FIG. 2, the method may continue with training a regressor model. In some embodiments, the system 100 trains a user specific regressor based for recommending a video streaming plan. Regression in machine learning includes mathematical methods that allow data scientists to predict a continuous outcome (y) based on the value of one or more predictor variables (x). Linear regression is probably the most popular form of regression analysis because of its ease-of-use in predicting and forecasting.

In some embodiments, training the regressor model can include machine learning employing artificial neural networks. Referring to FIG. 2, the training of the regressor model is used to forecast a user's carbon footprint in the in the upcoming month that results from their usage of the streaming services of the streaming service provider 50. At block 5, using the regressor model, the method can continue with forecasting a carbon footprint for the upcoming month. From the forecast, the method recommends a base streaming plan to the user at block 6.

The formulation of the regressor model and the forecast for the carbon production by the user may be generated by a streaming plan generator 103, which also provides the function of generating a plan in accordance with the forecast for carbon production. The streaming plan generator 103 includes a regressor model for generating the model using the data produced by the data collection engine 102, and a plan generator 103, which employs the regression model to deliver a plan to the user. The plan takes into consideration both streaming quality and carbon production.

The regressor model as well as the plan generator may both include memory having a number of instructions in preparing the regressor model, and applying the regressor model to provide a streaming plan to the user. The instructions are executable by at least one hardware processor. As indicated above, the streaming plan generator 103 may employ machine learning in generating the regressor model, and applying the regressor model to provide streaming plans to the user's taking into account carbon production. In some embodiments, the machine learning step employs an artificial neural network (ANN)>

In general, the artificial neural network (ANN) that may be used by the streaming plan generator 103 is an information processing system that is inspired by biological nervous systems, such as the brain. One element of ANNs is the structure of the information processing system, which includes a large number of highly interconnected processing elements (called "neurons") working in parallel to solve specific problems. ANNs are furthermore trained using a set of training data, with learning that involves adjustments to weights that exist between the neurons. An ANN is configured for a specific application, such as pattern recognition or data classification, through such a learning process.

Figure 4:
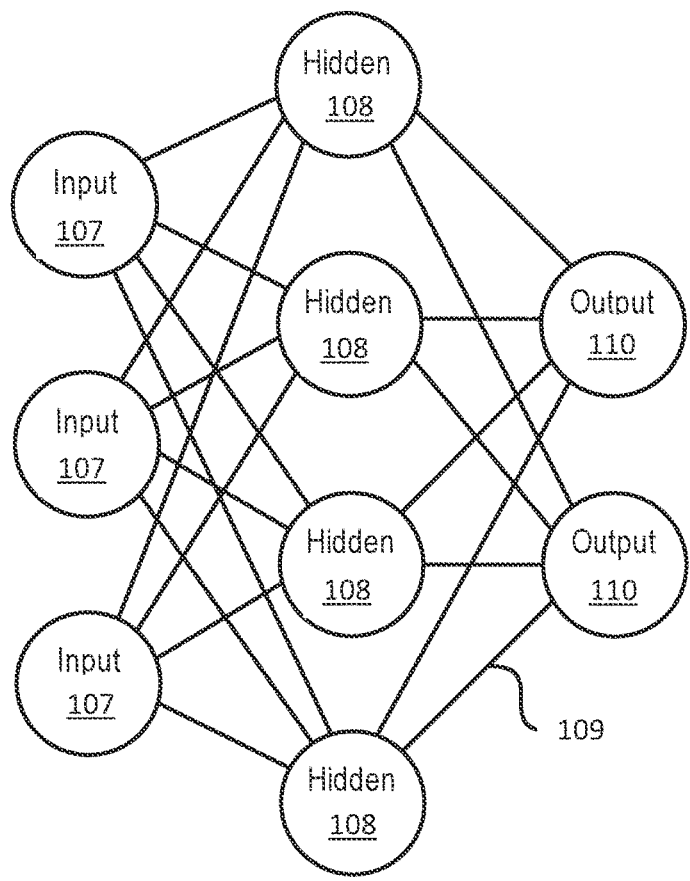
FIG. 4 is a block diagram of a neuron as used in a neural network, in accordance with one embodiment of the present disclosure.

Referring now to FIG. 4, a generalized diagram of a neural network is shown. Although a specific structure of an ANN is shown, having three layers and a set number of fully connected neurons, it should be understood that this is intended solely for the purpose of illustration. In practice, the present embodiments may take any appropriate form, including any number of layers and any pattern or patterns of connections therebetween.

ANNs demonstrate an ability to derive meaning from complicated or imprecise data and can be used to extract patterns and detect trends that are too complex to be detected by humans or other computer-based systems. The structure of a neural network is known generally to have input neurons 102 that provide information to one or more "hidden" neurons 104. Connections 108 between the input neurons 102 and hidden neurons 104 are weighted, and these weighted inputs are then processed by the hidden neurons 104 according to some function in the hidden neurons 104. There can be any number of layers of hidden neurons 104, and as well as neurons that perform different functions. There exist different neural network structures as well, such as a convolutional neural network, a maxout network, etc., which may vary according to the structure and function of the hidden layers, as well as the pattern of weights between the layers. The individual layers may perform particular functions, and may include convolutional layers, pooling layers, fully connected layers, softmax layers, or any other appropriate type of neural network layer. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. The error relative to the training data is then processed in "backpropagation" computation, where the hidden neurons 104 and input neurons 102 receive information regarding the error propagating backward from the output neurons 106. Once the backward error propagation has been completed, weight updates are performed, with the weighted connections 108 being updated to account for the received error. It should be noted that the three modes of operation, feed forward, back propagation, and weight update, do not overlap with one another. This represents just one variety of ANN computation, and that any appropriate form of computation may be used instead.

To train an ANN, training data can be divided into a training set and a testing set. The training data includes pairs of an input and a known output. During training, the inputs of the training set are fed into the ANN using feed-forward propagation. After each input, the output of the ANN is compared to the respective known output. Discrepancies between the output of the ANN and the known output that is associated with that particular input are used to generate an error value, which may be backpropagated through the ANN, after which the weight values of the ANN may be updated. This process continues until the pairs in the training set are exhausted. In some embodiments, the streaming plan generator 103 trains to match search items extracted from definitions for requirements used in the requirement management tool to source code that is stored in repositories.

After the training has been completed, the ANN may be tested against the testing set, to ensure that the training has not resulted in overfitting. If the ANN can generalize to new inputs, beyond those which it was already trained on, then it is ready for use. If the ANN does not accurately reproduce the known outputs of the testing set, then additional training data may be needed, or hyperparameters of the ANN may need to be adjusted.

ANNs may be implemented in software, hardware, or a combination of the two. For example, each weight 108 may be characterized as a weight value that is stored in a computer memory, and the activation function of each neuron may be implemented by a computer processor. The weight value may store any appropriate data value, such as a real number, a binary value, or a value selected from a fixed number of possibilities, that is multiplied against the relevant neuron outputs. Alternatively, the weights 108 may be implemented as resistive processing units (RPUs), generating a predictable current output when an input voltage is applied in accordance with a settable resistance.

Figure 5:
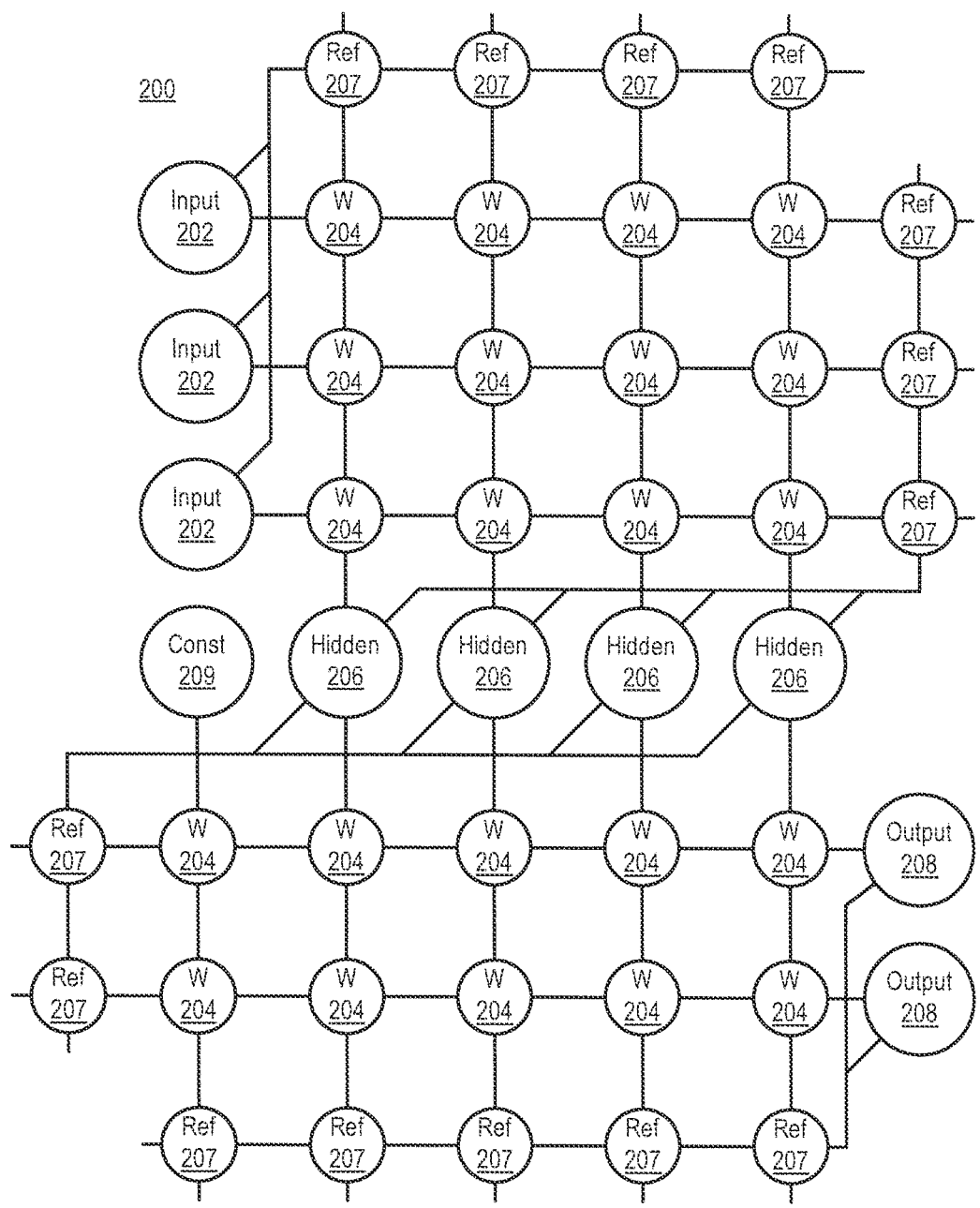
FIG. 5 is an illustration of a generalized diagram of a neural network, in accordance with one embodiment of the present disclosure.

Referring now to FIG. 5, a hardware architecture 200 for an ANN is shown. It should be understood that the present architecture is purely exemplary, and that other architectures or types of neural network can be used instead. The hardware embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed, and the weights described herein can be replaced with more complicated forms of interconnection.

During feed-forward operation, input neurons 202 each provide an input voltage in parallel to a respective row of weights 204. In the hardware embodiment described herein, the weights 204 each have a settable resistance value, such that a current output flows from the weight 204 to a respective hidden neuron 206. The current output by the weight 204 therefore represents a weighted input to the hidden neuron 206.

Following the hardware embodiment, the current output by a given weight 204 is determined as $I=V/r$, where V is the input voltage from the input neuron 202 and r is the set resistance of the weight 204. The currents from each of the weights 204 add column-wise and flow to a hidden neuron 206.

A set of reference weights 207 have a fixed resistance and combine their outputs into a reference current that is provided to each of the hidden neurons 206. Because conductance values can only be positive numbers, some reference conductance is needed to encode both positive and negative values in the matrix. The currents produced by the weights 204 are continuously valued and positive, and therefore the reference weights 207 are used to provide a reference current, above which currents are considered to have positive values and below which currents are considered to have negative values. The use of reference weights 207 is not needed in software embodiments, where the values of outputs and weights can be precisely and directly obtained. As an alternative to using the reference weights 207, another embodiment can use separate arrays of weights 204 to capture negative values.

The hidden neurons 206 use the currents from the array of weights 204 and the reference weights 207 to perform some calculation. This calculation may be, for example, any appropriate activation function, and may be implemented in hardware using appropriate circuitry, or in software.

The hidden neurons 206 then output a voltage of their own, based on the activation function, to another array of weights 204. This array performs its weighting calculations in the same way, with a column of weights 204 receiving a voltage from their respective hidden neuron 206 to produce a weighted current output that adds row-wise and is provided to the output neuron 208.

It should be understood that any number of these stages can be implemented, by interposing additional layers of arrays and hidden neurons 206. It should also be noted that some neurons can be constant neurons 209, which provide a constant output to the array. The constant neurons 209 can be present among the input neurons 202 and/or hidden neurons 206 and are only used during feed-forward operation.

During back propagation, the output neurons 208 provide a voltage back across the array of weights 204. The output layer compares the generated network response to training data and computes an error. The error is applied to the array as a voltage pulse, where the height and/or duration of the pulse is modulated proportional to the error value. In this example, a row of weights 204 receives a voltage from a respective output neuron 208 in parallel and converts that voltage into a current which adds column-wise to provide an input to hidden neurons 206. The hidden neurons 206 combine the weighted feedback signal with a derivative of its feed-forward calculation and stores an error value before outputting a feedback signal voltage to its respective column of weights 204. This back propagation travels through the entire neural network 200 until all hidden neurons 206 and the input neurons 202 have stored an error value.

The weight update process will depend on how the weights 204 are implemented. For settable resistances that include phase change materials, the input neurons 202 and hidden neurons 206 may apply a first weight update voltage forward and the output neurons 208 and hidden neurons 206 may apply a second weight update voltage backward through the neural network 200. The combinations of these voltages may create a state change within each weight 204, causing the weight 204 to take on a new resistance value, for example by raising a temperature of the weight 204 above a threshold and thus changing its resistance. In this manner the weights 204 can be trained to adapt the neural network 200 to errors in its processing.

As noted above, the weights 204 can be implemented in software or in hardware, for example using relatively complicated weighting circuitry or using resistive cross point devices. Such resistive devices may have switching characteristics that have a non-linearity that can be used for processing data. The weights 204 can belong to a class of device called a resistive processing unit (RPU). The RPU devices can be implemented with resistive random access memory (RRAM), phase change memory (PCM), programmable metallization cell (PMC) memory, or any other device that has non-linear resistive switching characteristics. Such RPU devices can also be considered as memristive systems.

In some embodiments, the machine learning engine 32 may employ any type of neural network, such as Autoencoder networks, Convolutional Neural Networks, Recurrent Neural Networks and Long Short-Term Memory Networks, to train to match search items extracted from definitions for requirements used in the requirement management tool to source code that is stored in repositories.

Convolutional Neural Networks-Convolutional neural networks (CNNs) process information using a sliding "window" across an input, with each neuron in a CNN layer having a respective "filter" that is applied at each window position. Each filter may be trained, for example, to handle a respective pattern within an input. CNNs are particularly useful in processing images, where local relationships between individual pixels may be captured by the filter as it passes through different regions of the image. The output of a neuron in a CNN layer may include a set of values, representing whether the respective filter matched each set of values in the sliding window.

Recurrent Neural Networks-Recurrent neural networks (RNNs) may be used to process sequences of information, such as an ordered series of feature vectors. This makes RNNs well suited to text processing and speech recognition, where information is naturally sequential. Each neuron in an RNN receives two inputs: a new input from a previous layer, and a previous input from the current layer. An RNN layer thereby maintains information about the state of the sequence from one input to the next.

Long Short-Term Memory Networks-Long short-term memory (LSTM) networks are a variety of RNN that store information within the LSTM neurons for future use. Use of the memory may be controlled by the neuron's activation function. The use of this memory helps preserve gradient information during backpropagation.

Autoencoder networks-Autoencoder networks may include two sections: an encoder section and a decoder section. The encoder section may create a relatively low-dimensional embedding of a relatively high-dimensional input, while the decoder section may recreate the original high-dimensional input. The autoencoder network is trained to recreate the original input as closely as possible. Such networks may be used in various ways. For example, the low-dimensional embedding may be used as a relatively compact representation of the original input. The high-dimensional output, meanwhile, may be used to reconstruct information from a noisy input.

In some embodiments, the machine learning employed by the streaming plan generator may be multilayer perception. Multilayer perceptron (MLP) is a class of feedforward artificial neural network. MLP utilizes a supervised learning technique called backpropagation for training. Its multiple layers and non-linear activation distinguish MLP from a linear perceptron.

In another embodiment, the neural network may include long short-term memory (LSTM). LSTM is an artificial recurrent neural network (RNN) architecture used in the field of deep learning. Unlike standard feedforward neural networks, LSTM has feedback connections. A common LSTM unit is composed of a cell, an input gate, an output gate and a forget gate. The cell remembers values over arbitrary time intervals and the three gates regulate the flow of information into and out of the cell. LSTM networks are well-suited to classifying, processing and making predictions based on time series data, since there can be lags of unknown duration between important events in a time series.

In yet another embodiment, the neural network may provide a random forest. Random forests or random decision forests are an ensemble learning method for classification, regression and other tasks that operates by constructing a multitude of decision trees at training time. For classification tasks, the output of the random forest is the class selected by most trees. For regression tasks, the mean or average prediction of the individual trees is returned. Random decision forests correct for decision trees' habit of overfitting to their training set. Random forests generally outperform decision trees, but their accuracy is lower than gradient boosted trees.

Using the data collected at block 2, and the regressor model at block 4, in combination with machine learning, the system 100 can forecast the carbon footprint of the user in the coming month at block 5. The input to the system is the streaming history of the user 10. The history of the user can include data such as the number of account users, e.g., secondary users, that are streaming for the parent streaming account, i.e., primary user. The locations of the users using the streaming service are also considered. System parameters are also considered, such as device types and the number of devices, as well as the types of networks that the streaming performance is performed upon. Also considered in forecasting future streaming performance is the watching patterns, e.g., time periods on the calendar at which people watch, and duration of watching. The input to the system may also include external conditions, such as holidays. From that data, the carbon forecast for the upcoming month can be calculated. For example, the carbon forecast can be on the order of 50 kg for a user per month. In some examples, the carbon forecast may range from 25 kg to 75 kg for a user per month. In yet another example, the carbon forecast may range from 35 kg to 65 kg for a user per month.

Referring to block 6 of FIG. 2, with the estimate of the carbon forecast calculated, the system 100 can then recommend the streaming plan that has the appropriate carbon footprint. For example, streaming plans can be characterized as being for only mobile devices, a basic plan that includes standard definition streaming, a standard high definition plan, and a premium plan. Each plan may also include a number of devices on which streaming may be performed. For example, in the mobile plan, the user may stream 1 video on a mobile phone or tablet in standard definition at a time; while the basic plan can allow a user to watch on one full size TV screens at a time in standard definition; and a standard high definition (HD) plan will allow a user to watch on two screens at a time (mobile and/or large screen) and allows for full 1080 HD quality. For downloading, the mobile plan and base allows for downloading on one mobile device. The standard high definition plan allows for downloading on two devices. A premium ultra-high definition plan can also be available, which for example can provide for both 1080 HD quality and 4K quality, and may allow for streaming on multiple screens, such as four screens at a time (mobile and/or large screen). Each of the aforementioned plans has a fee schedule, e.g., increasing from the minimum fee for the mobile service to the highest charges for the premium ultra-high definition plan.

The methods, systems and computer program products of the present disclosure based upon the forecast the carbon footprint of the user in the coming month that is determined at block 5 can recommend one of the aforementioned plans with an associated carbon units, e.g., kg. For example, the mobile plan will be lightest on carbon emissions. The carbon units can be expressed using a unitless measurement, such as CU. For example, carbon emissions of 20 kg can be expressed as 20 CU. In one example, the mobile plan may have 20 CU, e.g., 20 kg, for carbon emission, in a month; the basic plan may have 60 CU, e.g., 60 kg, for carbon emission, in a month; the standard high definition plan may have 80 CU, e.g., 80 kg, for carbon emission, in a month; and the premium ultra-high definition plan may have 100 CU, e.g., 100 kg, for carbon emission, in a month. The carbon emissions are correlated to the amount of streaming in the particular plan that produces carbon emission. In the example above, the mobile plant has the least streaming load, and therefore has the lowest carbon emissions. In the example above, the ultra-high definition plan has the highest streaming load, and therefore the highest streaming emissions.

At block 6 of FIG. 2, following the steps of applying the regressor model to forecast the carbon footprint of a user, the forecasted carbon need of the user is matched to the carbon output of a streaming plan. This can provide the baseline upon which the users continuous streaming performance is modified by the system to meet a carbon emission guidelines that is consistent with the streaming plan chosen by the user. At block 7, the user 10 receives the suggested streaming plan from block 6. The system 100 may be in communication with the streaming service provider. The streaming service provider 50 in turn, may provide the streaming plan recommended by the system 100 to the user 10. The user 10 can then confirm that they will employ the recommended streaming plan. This may occur during block 7. When the user selects a plan having a predefined carbon usage, the user confirms a carbon emission constraint, e.g., the user is setting the carbon emission that they agree to in using the streaming service.

At this stage, the system 100 has provided to the user 10 a carbon aware streaming plan that includes the carbon balance and a payment amount, e.g., per month fee. The carbon aware streaming plan also includes a number of constraints, such as the amount of devices on which streaming media can be shown, and the type of devices on which the media can be shown. Quality of streaming media, such as resolution, is another example of a constraint for a streaming plan.

In some embodiments, following the users' adoption of a streaming plan that matches the forecasted carbon output of the user 10, the methods, systems and computer program products can dynamically optimizing video streaming to satisfy carbon constraint (balance) and maximizing user experience using multi-objective optimization. The methods, systems and computer program products can track carbon emission with the help of carbon emission calculator that analyzes different factors such as device type, network type etc. Tracking may be performed by the carbon tracker 110 of the system depicted in FIG. 3. The proposed systems can then auto-adjust video content quality to maximize user experience metric while satisfying carbon balance in accordance with the plan that the user selected in accordance with block 7 of the method depicted in FIG. 2.

Figure 6:
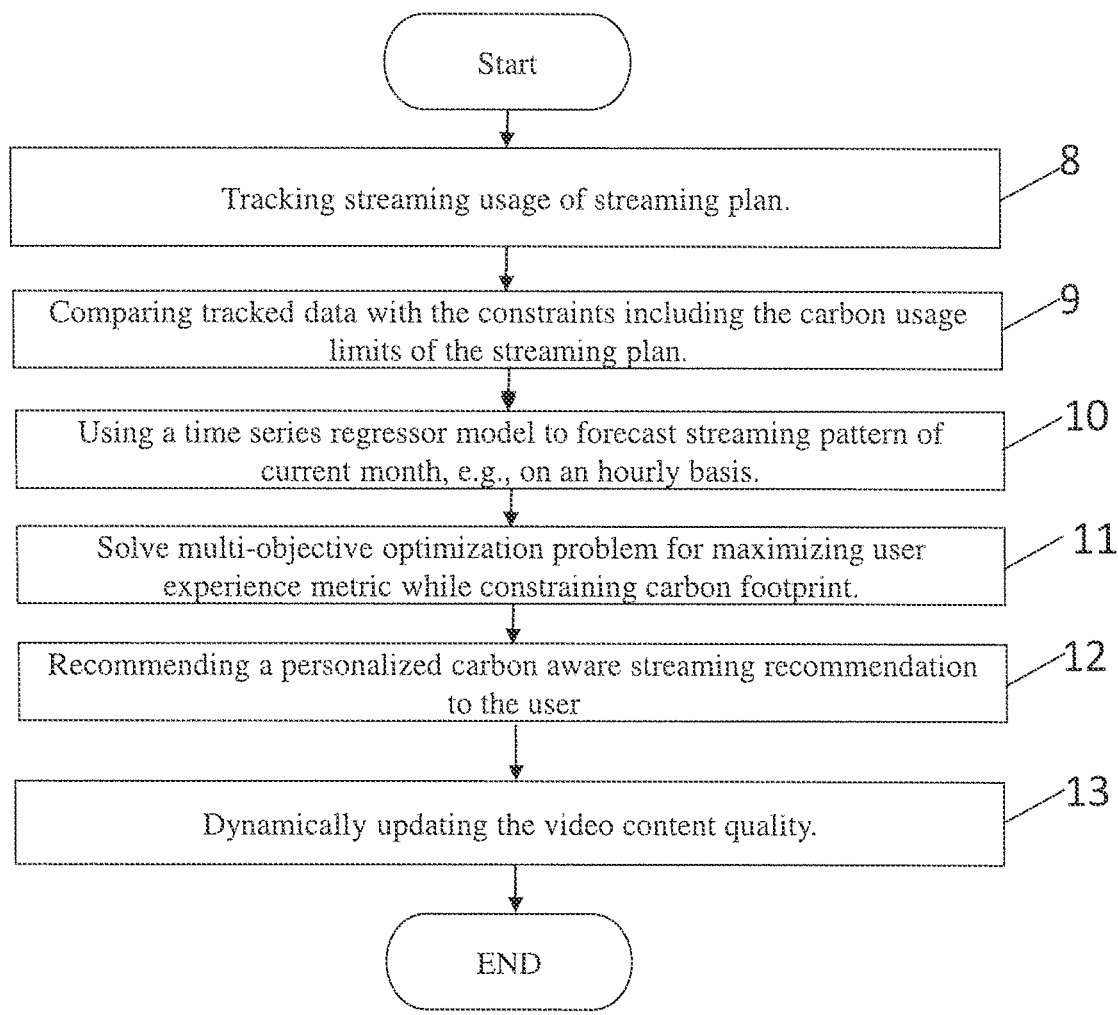
FIG. 6 is a flow chart/block diagram illustrating a method for dynamically adjusting video content to satisfy a carbon emission constraint consistent with the carbon aware streaming plan, in accordance with one embodiment of the present disclosure.
Figure 7:
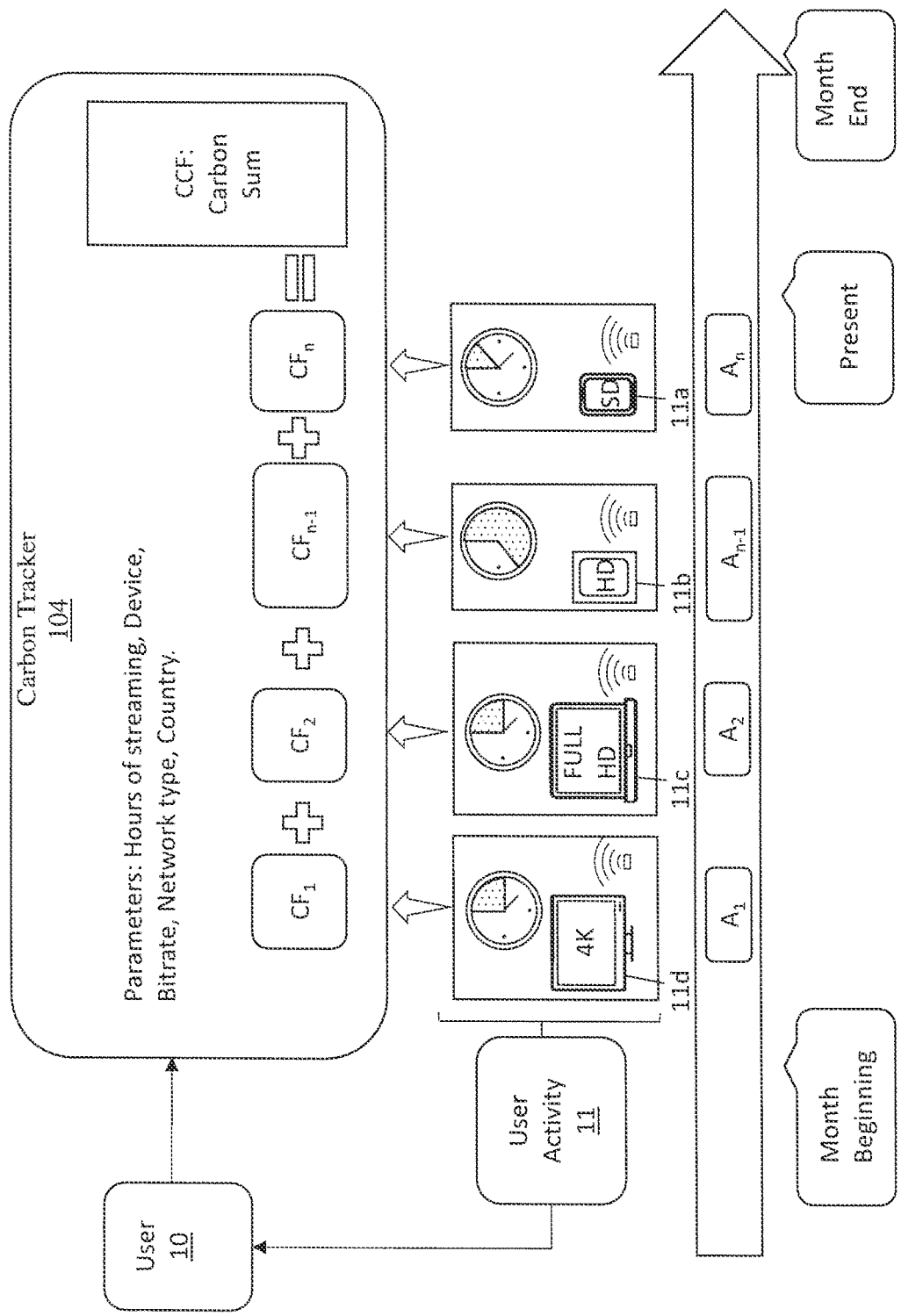
FIG. 7 is an illustration of a timeline for the carbon footprint for a user that is calculated from each of the user's activities over time.

FIG. 6 illustrates one embodiment of dynamically adjusting video content to satisfy a carbon emission constraint. At block 8, the method may include tracking the user's streaming usage in accordance with the plan constraints they selected, e.g., the streaming plan and carbon units at block 7. Tracking the streaming usage may include the content being viewed, the duration of the viewing, and the type and number of devices on which the streaming content is being viewed. The tracked data is recorded using the carbon tracker 104 of the system depicted in FIG. 3. At block 9, the tracked data is compared with the recorded constraints from the streaming plan selected by the user. The regressor model is again analyzed at block 9, in which the real time tracked streaming data as an input and using the constraints from the streaming plan selected by the user to provide a monthly forecast at block 10 for how the user's streaming performance is matching their carbon constraint.

Figure 8:
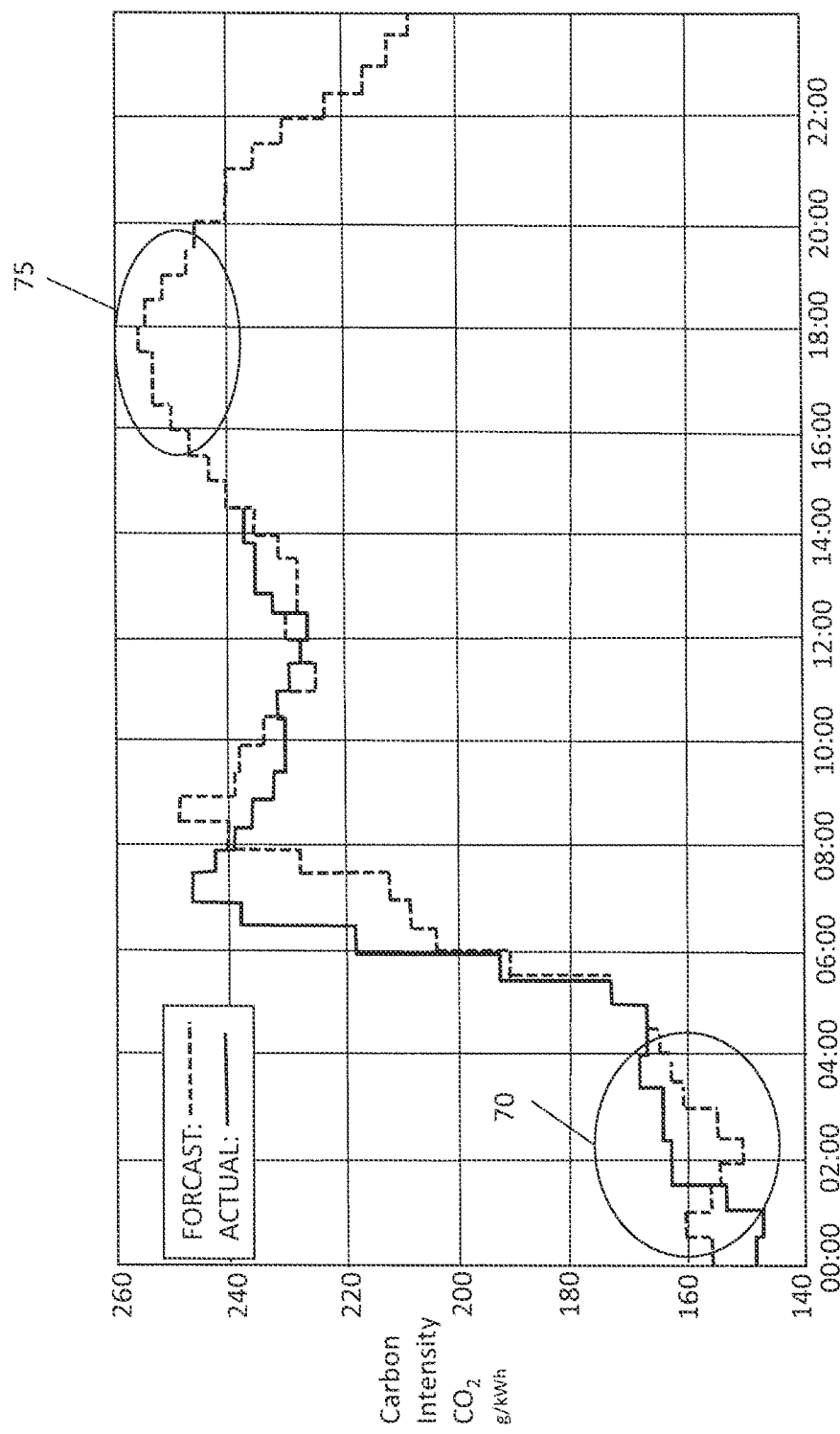
FIG. 8 is a plot of carbon intensity for streaming as a function of time within a day, which illustrates that carbon intensity for streaming is lowest in the morning time periods of the day.

Still referring to FIG. 6, to maintain a high quality of streaming performance within the carbon limits of the carbon constraint, the method solves a multi-objective optimization problem for maximizing the user experience metric while constraining the carbon footprint at block 11. The multi-objective optimization problem may have an input provided by an hourly forecast of carbon intensity for the streaming services of the user. The hourly forecast is considered with a plot of the user's balance for the period being considered, e.g., a monthly carbon allowance for streaming services, as per a user experience metric. The user experience metric is the forecasted use of services by the user, e.g., the streaming content quality, duration, number of screens being viewed, etc. The hourly forecast is taken to track the current carbon balance (CB) of the user is defined as the carbon units of the monthly streaming plan subtracting a current carbon footprint for the user:

Current Carbon Balance($CB$)=Monthly Streaming Plan-Current Carbon footprint ($CCF$).  Equation 1:

Referring to FIG. 8, the Current Carbon Footprint (CCF) is calculated as follows:

Current Carbon Footprint($CCF$)=$\sum_{i=1}^{n} CFi$, where $CFi$ is the carbon footprint of activity $A_i$.  Equation 2:

FIG. 8 illustrates the carbon footprint for a user that is calculated from each of the user's activities over time. FIG. 8 illustrates a timeline for a user's 10 carbon footprint for a month, which is the summation of each of the user's activities. For example, $A_1$ may represent streaming at 4K resolution on a large screen TV, whereas $A_2$ may represent full HD viewing on a mobile computing device, such as a laptop. Each of these activities $A_1$, $A_2$ have an associated carbon footprint $CF_1$ and $CF_2$. $A_{N-1}$ represents high definition (HD) streaming on a mobile computing device, such as a tablet computer. $A_N$ represents standard definition (SD) streaming event from a mobile device, such as smart phone. The activities $A_{n-1} \ldots A_n$ have an associated carbon footprint $CF_n$ and $CF_{n-1}$. In measuring the carbon footprint, the following parameters are considered for each activity: hours of streaming, device, bitrate, network type and county. The current carbon footprint (CCF) is the summation of the carbon footprint of each activity for the user, and the current balance (CCB) is the remainder of the monthly streaming plan after subtracting the current carbon footprint (CCF).

The multi-objective optimizing may also include using the time series regressor model to forecast streaming pattern of the current month on an hourly basis. Historical patterns are fed into a regressor model. Other input variables for the regressor model can include exogenous variables for activities, i.e., streaming events, like upcoming holidays, festivals, and new video content launches. For example, new video content meeting the preferences of the user can impact the carbon footprint. Using the regressor model, and the aforementioned inputs, a forecast of a streaming pattern is provided for the current month on an hourly basis. Forecasting streaming patterns for the upcoming portion of the current month can include using information such as historical video streaming patterns, exogenous variables for activities like upcoming holidays, festivals, and new video content launches. It results in a binary output It, where 1 means activity in an hour 't' of the month, while 0 means no activity, as follows:

$$It = \begin{cases} 1, t \text{ is Activity hour} \\ 0, t \text{ is non- activity hour} \end{cases}$$  Equation 3

Equation 3 is used to calculate the User Experience Metric and Carbon Footprint of the user for the current month. These metrics form the objectives for multi-objective optimization which is then also used to dynamically auto-adjust video content quality.

Solving the multi-objective optimization problem can also include an hourly forecast of grid carbon intensity. Grid carbon intensity may include a plot that suggests that watching a video in the morning has a lower carbon footprint than watching the same video in the afternoon or evening. Green scheduling enables the user to watch in lower carbon intensity hours resulting in lower carbon emissions, which in some instances can improve the user experience metric.

FIG. 8 is a plot of carbon intensity for streaming as a function of time within a day, which illustrates that carbon intensity for streaming is lowest in the morning time periods of the day. The low carbon intensity hours are identified by reference number 70, and the high intensity hours are identified by reference number 75.

In some embodiments, maximizing the user experience metric and minimizing the carbon footprint using the multi-objective optimization including calculating the user experience metric and user personalization parameters. The user experience metric is a function of the quality of video streaming (Q), e.g., standard definition (SD), high definition (HD), full high definition and 4k; the device for streaming (D), e.g., Smart TV, laptop, tablet, mobile phone, etc.; network type (N), e.g., 4G network, 5G network, and WIFI; the time at which the streaming occurs (time of day); and the content of the video.

In some embodiments, the user experience for the activity hours (t), is defined as follows:

User experience metric$(1)=\Sigma_{n\in N} \Sigma_{d\in D} \Sigma_{g\in Q} U$(quality=$q$,device=$d$,network=$n$;$t$)*$p$(quality=$q$, device=$d$,network=$n$;user,$t$)     Equation (4):

U ($q$,$d$,$n$;$t$) is the number of systems used in streaming during time ($t$), in which for each of the systems the video quality ($q$), device type ($t$), and network type ($n$) is all considered in determining the carbon output.

User personalization parameters (p (quality=$q$, device=$d$, network=$n$) are calculated using the Maximum Likelihood Estimation (MLE) as follows:

$p(q,d,n;\text{user},t)$=(streaming time using video quality ($q$),device($d$), and network type($n$) by the user during time $t$ of the day)/(total streaming time of the user during time $t$ of the day)     Equation (5):

The User Experience Metric for a time window (W) can be calculated as follows:

User Experience Metric=$\Sigma_{t\in W} I_t$*(User experience metric($t$)), where $I_t\{0,1\}$ denotes activity in $t$.     Equation (6):

In some embodiments, maximizing the user experience metric and minimizing the carbon footprint using the multi-objective optimization may continue with solving the multi-objective optimization problem. In some embodiments, solving the multi-objective optimization problem can include minimizing the 1-User Experience Metric subject to:

$\Sigma_{t\in W} \Sigma_{n\in N} \Sigma_{d\in D} \Sigma_{e\in Q} I_t$*($U$(quality=$q$,device=$d$, network=$n$;$t$)*$c$(quality=$q$,device=$d$,network=$n$; user,$t$))$\leq CB\Sigma_{n\in N} \Sigma_{d\in D} \Sigma_{q\in Q}(U$(quality=$q$, device=$d$,network=$n$;$t$)$\in\{0,1,2,\ldots,m\})$     Equation (7):

In Equation (7), m is the maximum allowed devices at one time that a user may stream media upon, in accordance with the user's streaming plan, as provided by the streaming service provider. $I_t \in \{0,1\}$ is the activity flag obtained from the regressor model.

c (quality=$q$, device=$d$, network=$n$;$t$) is the carbon emission factors per hour for video quality ($q$), device ($d$) and network type ($n$) for time ($t$). The factors depend on time of streaming as well as the carbon intensity of grid varies through the day. Hourly forecast of carbon intensity is used from the emission factors. CB is the current carbon balance for timeframe t.

Figure 9:
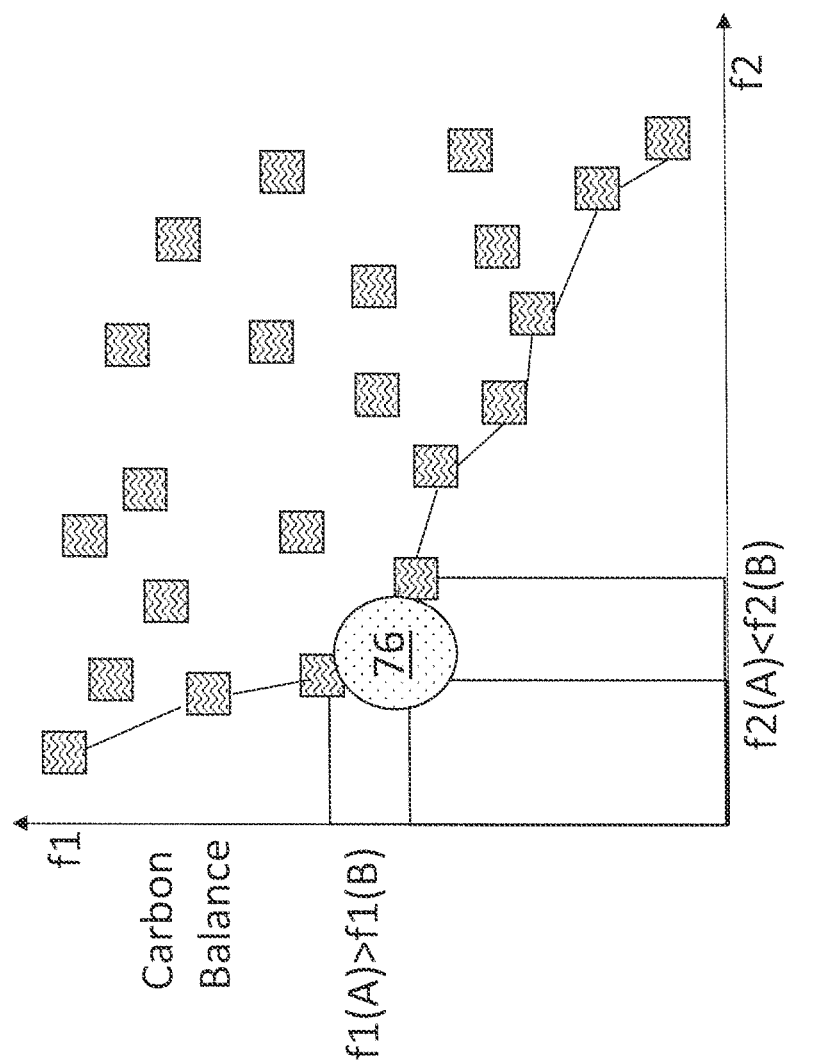
FIG. 9 is a plot of the carbon balance as a function of the user experience metric.
Figure 10:
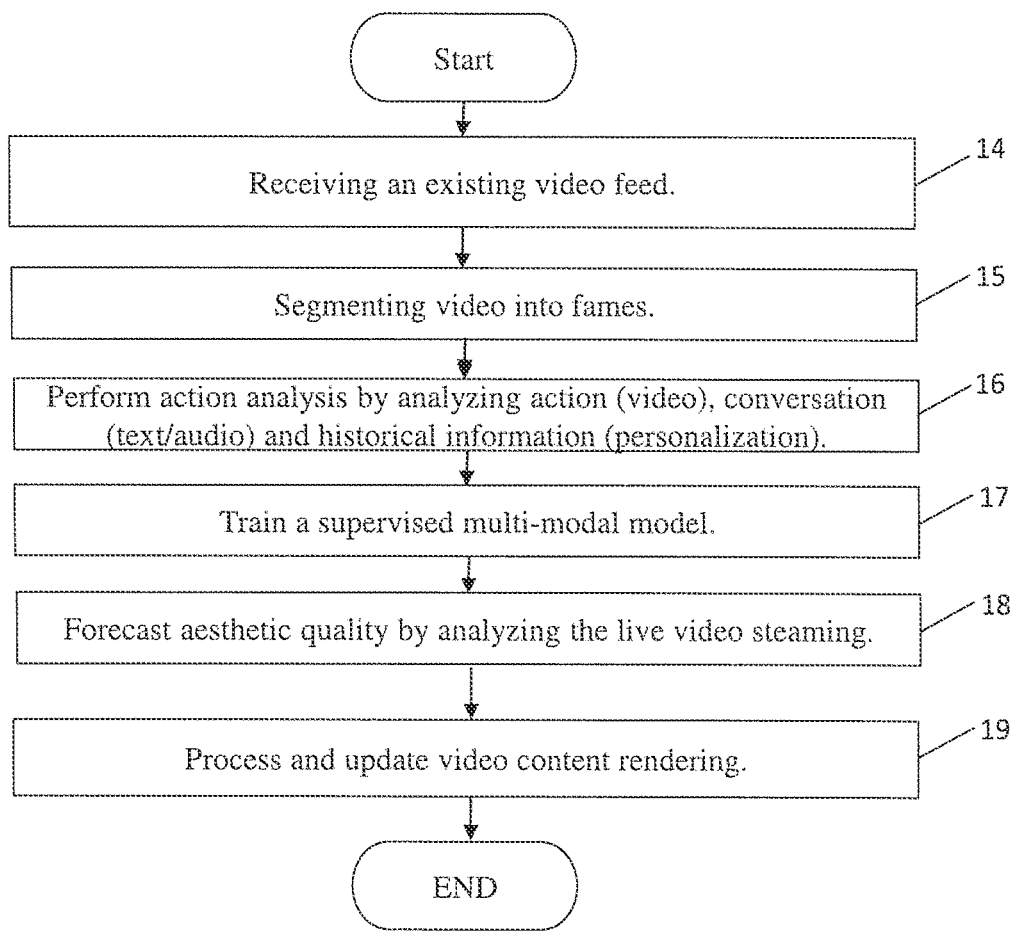
FIG. 10 is a flow chart/block diagram illustrating a method for auto-adjusting video content quality to maximize

FIG. 9 is a plot of the carbon balance as a function of the user experience metric. From the plot in FIG. 9 the highest user experience settings can be selected for the carbon balance that remains in the month. The plot in FIG. 9 is generated after performing the multi-objective optimization. There are mainly two objectives that need to be optimized, such as that it minimizes carbon emission and maximizes user experience metric (minimize (1-user experience)). The optimized points in the plot is illustrated by the region having reference number 76, which represents the personalized streaming plan which minimizes carbon balance and maximizes user experience metric.

Referring back to FIG. 6, once the multi-objective optimization problem is solved at block 11, the method may continue to making carbon aware personalization recommendations at block 12, and dynamically updating the video quality at block 13.

In some embodiments, maximizing the user experience metric and minimizing the carbon footprint using the multi-objective optimization may continue with adjusting (auto-adjust) video content quality to maximize the user experience metric while satisfying carbon balance (CB). This can be provided by the streaming content modifier 105 of the system 100 depicted in FIG. 3.

Different frames of streamed video content have a different impact on the user experience. For example, a frame that only includes easily readable text, such as a title screen or a screen listing credits, etc., will have little impact on the user experience. For example, changing the resolution from standard definition to high definition or 4K resolution of a screen including only large text will have little impact on the users viewing experience. However, in comparison to a screen only including text, a frame including images having a lot of colors and aesthetics can have a high impact on the user experience. Further, some types of streaming media include frequent temporal changes, and would be preferable to watch at higher frame rates.

In some embodiments, adjusting the video content quality to maximize the user experience metric can include dividing the video content by performing video segmentation based on temporal changes. Video (temporal) segmentation is the process of partitioning a video sequence into disjoint sets of consecutive frames that are homogeneous according to some defined criteria. In some embodiments, the defined criteria may be a temporal change that meets a threshold value.

Following video segmentation, the method may continue with estimating the aesthetic quality of each of the sub-video (subframe) based on the multiple different parameters, such as whether an object is present in the video, whether the video is depicting movement (activity) of the object, as well as information content present in the sub-video.

In some embodiments, the method may continue with computing the carbon emissions for each segment of the video. Computing the carbon emissions can take into account the device type, e.g., a large screen TV, on which the users is viewing the streaming media from which the segment was taken; the network type on which the streaming video was transmitted, e.g., WiFi. 4G or 5G; and the time of the content rendering for each segment for each sub video.

In some embodiments, the method may further include dynamically solving the knapsack problem which figures out the quality of each video segment based on the available carbon balance and the aesthetic quality of the video segment. The knapsack problem is a problem in combinatorial optimization: Given a set of items, each with a weight and a value, determine the number of each item to include in a collection so that the total weight is less than or equal to a given limit and the total value is as large as possible.

In some embodiments, the step of auto-adjusting video content quality to maximize the user experience metric while satisfying carbon balance may include a process flow as depicted in FIG. 1I. In one example, the process flow depicted in FIG. 1I may begin with receiving an existing video feed at block 14. This may be what the user is streaming. At block 15, the video content being streamed is segmented into frames. At block 16, the process flow can continue with performing an analysis by analyzing action (video), conversation (text/audio), and historical information (personalization). The analysis can use context information from the users, and the historical streaming quality for the user. The analysis determines the carbon output for the frames from the segmented video content. From the carbon output produced by the frames of the segmented video content, a supervised multi-modal model is trained at block 17. Referring to block 18, the method can continue with using the multi-modal model to forecast the aesthetic quality by analyzing the live streaming video streaming. The video (current video) being streamed by the users is the input into the trained supervised multi-modal model. At block 19, using the multi-objective optimizer (carbon balance, user experience metric) and the forecast for the aesthetic quality at block 18, a process and update video content rendering is performed. The system 100 can automatically change the resolution of frames of the video. The system 100 sends a signal to the streaming service 50, which effectuates the changes in the streaming media to meet the carbon requirements of the streaming plan selected by the user.

Referring to FIG. 3, a system 100 is depicted that provides carbon aware streaming plans by analyzing a user's historical streaming patterns. The system for streaming media includes a hardware processor 13 and memory. The memory stores a computer program product, which, when executed by the hardware processor, causes the hardware processor 13 to analyse a streaming history of a user to determine a historical carbon footprint of the user's streaming history; and present at least one streaming plan includes target carbon footprint relative to the historical carbon footprint. The system 100 can further receive a user selection for one of the at least one streaming plan, wherein the user's streaming performance on the streaming plan is tracked for post streaming plan carbon emissions; and modify the user streaming performance for the post streaming plan carbon emissions to substantially match the target carbon footprint of the at least one streaming plan that is selected by the user.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.). In some embodiments, the hardware processor subsystem can include and execute one or more software elements. The one or more software elements can include an operating system and/or one or more applications and/or specific code to achieve a specified result. In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 11:
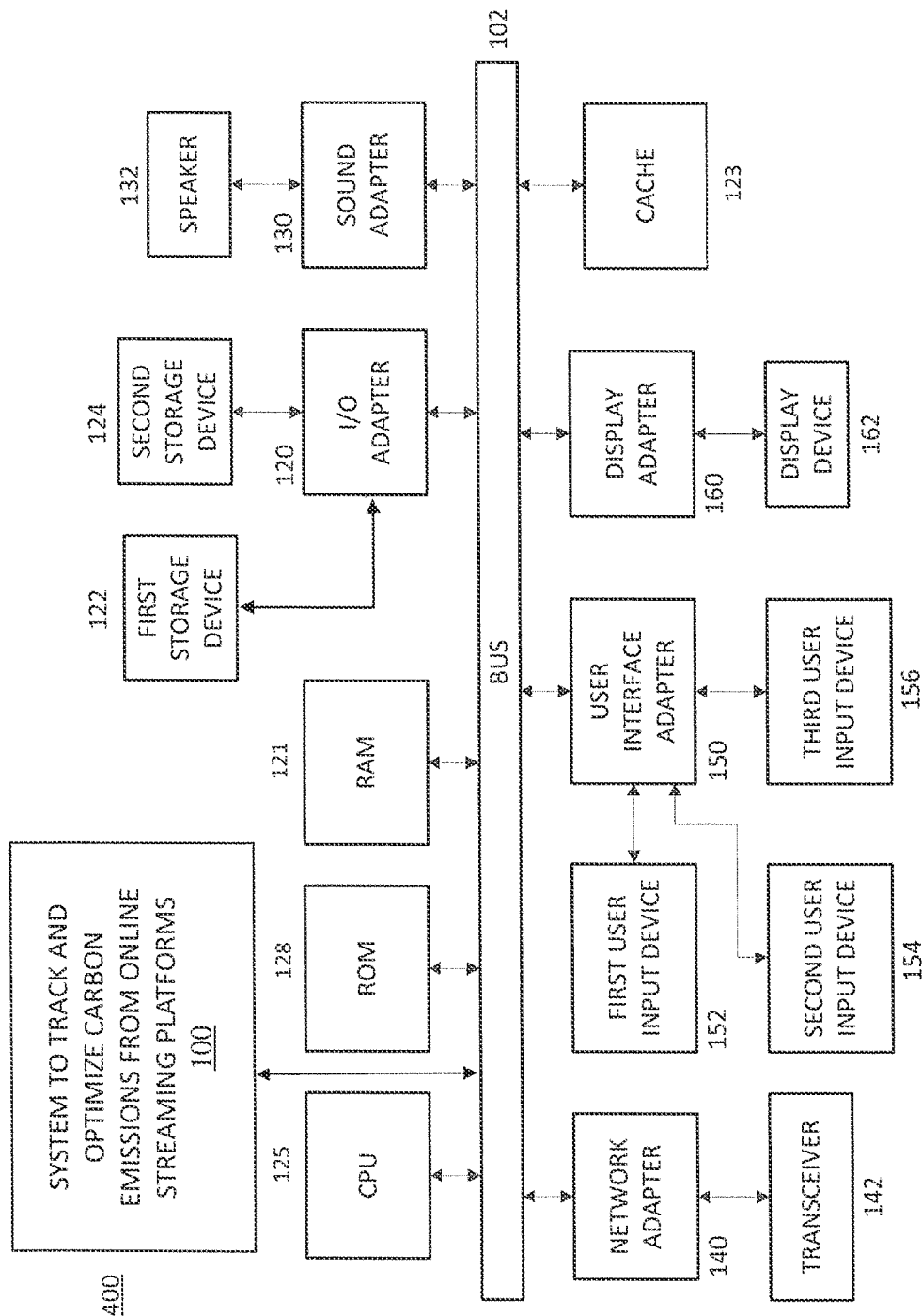
FIG. 11 is a block diagram illustrating a system that can incorporate the system that provides carbon aware streaming plans that is depicted in FIG. 3, in accordance with one embodiment of the present disclosure.

FIG. 11 is a block diagram illustrating a system 400 that can incorporate the system 100 that provides carbon aware streaming plans that is depicted in FIG. 3. The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

These and other variations of a hardware processor subsystem are also contemplated in accordance with embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention. In one embodiment, the computer program product configures streaming media to carbon footprint comprising a computer readable storage medium having computer readable program code embodied therewith, the program instructions executable by a processor to cause the processor to analyse, using the processor, a streaming history of a user to determine a historical carbon footprint of the user's streaming history; and present, using the processor, at least one streaming plan includes target carbon footprint relative to the historical carbon footprint. The computer program product can further receive, using the processor, a user selection for one of the at least one streaming plan, wherein the user's streaming performance on the streaming plan is tracked for post streaming plan carbon emissions; and modify, using the processor, the user streaming performance for the post streaming plan carbon emissions to substantially match the target carbon footprint of the at least one streaming plan that is selected by the user.

The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Therefore, in some embodiments, the computer readable storage medium may be referred to as being "non-transitory".

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

It is understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
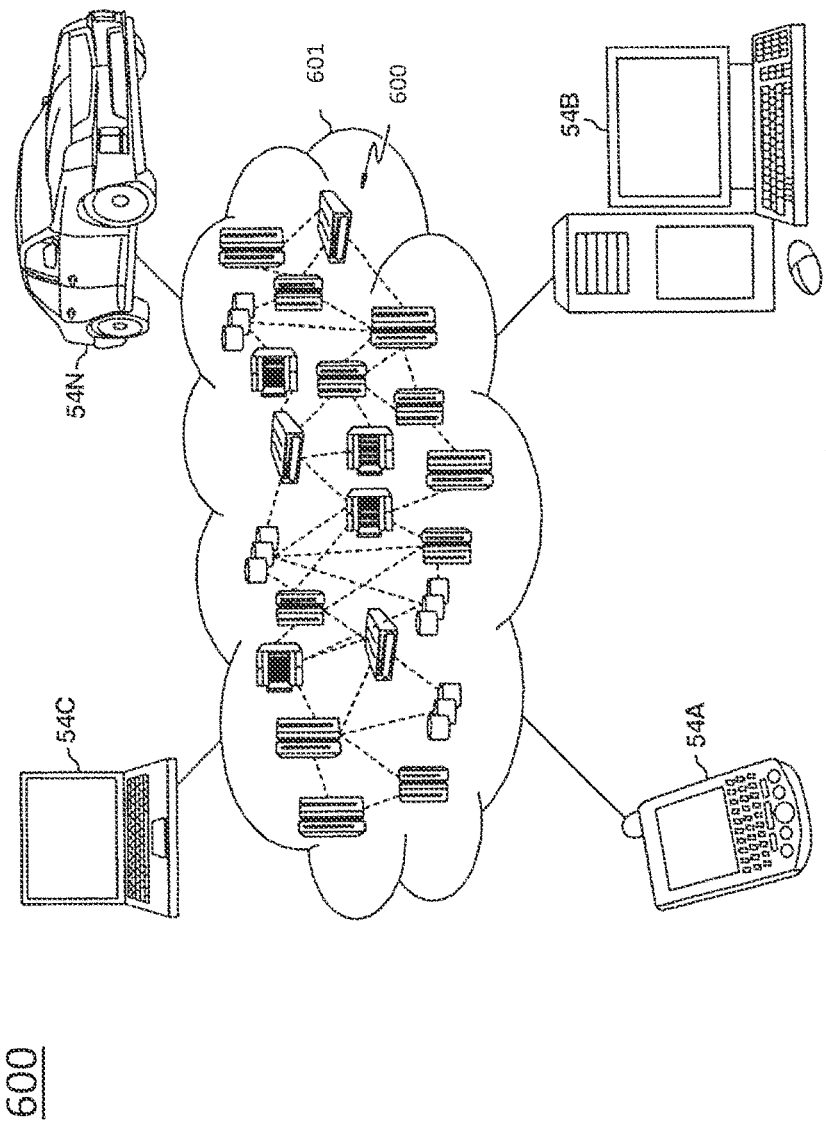
FIG. 12 depicts a cloud computing environment according to an embodiment of the present disclosure.

Referring now to FIG. 12, illustrative cloud computing environment 600 is depicted. As shown, cloud computing environment 600 comprises one or more cloud computing nodes 40054 with which local computing devices used by cloud consumers, such as, for example, personal digital assistant (PDA) or cellular telephone 54A, desktop computer 54B, laptop computer 54C, and/or automobile computer system 54N may communicate. The cloud computing environment 600 may provide an interface between the system 100 to track and optimize carbon emissions and the streaming platforms used by the users.

Referring to FIG. 12, the cloud computing nodes 54 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 54A-N shown in FIG. 12 are intended to be illustrative only and that computing nodes 54 and cloud computing environment 50 can communicate with any type of computerized device over any type of network and/or network addressable connection (e.g., using a web browser).

Figure 13:
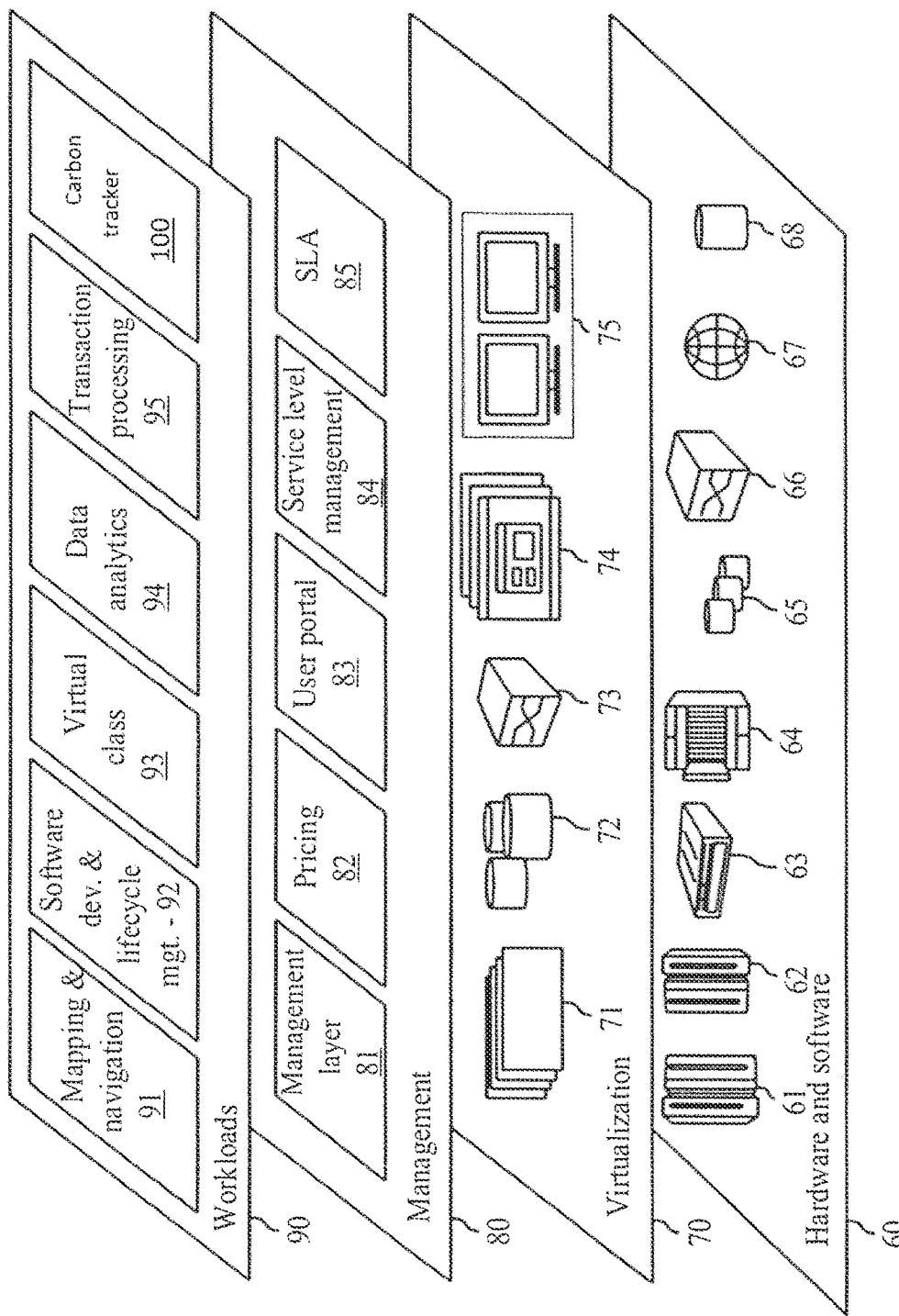
FIG. 13 depicts abstraction model layers according to an embodiment of the present disclosure.

Referring now to FIG. 13, a set of functional abstraction layers provided by cloud computing environment 600 (FIG. 12) is shown. It should be understood in advance that the components, layers, and functions shown in FIG. 13 are intended to be illustrative only and embodiments of the systems, methods and computer program are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; sensor validator 96 and pollutant source locator 97. The sensor validator 96 and the pollutant source locator 97 provided by workload layer 90 may include functions and/or methodologies of the sensor validator 903 and the system 100 to track and optimize carbon emissions, which are described above with reference to FIGS. 1-13.

Having described preferred embodiments for optimizing carbon emissions from online streaming platforms, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for optimizing streaming media comprising:
   analyzing a streaming history of a streaming subscription to determine a historical carbon footprint;
   training a neural network to forecast an upcoming carbon footprint based on the historical carbon footprint by matching search items extracted from user requirements and source code stored in repositories to obtain a trained neural network;
   producing, using the trained neural network, at least one streaming plan that includes a target carbon footprint relative to the upcoming carbon footprint;
   receiving a selected streaming plan for one of the at least one streaming plan having a target carbon emissions, wherein a streaming performance on the selected streaming plan is tracked for post streaming plan carbon emissions in carbon unit of measure;
   maximizing the streaming performance and minimizing the carbon emissions using multi-objective optimization during streaming by dynamically modifying the streaming performance including:
      dividing content being broadcast into frames by performing video segmentation of the content being broadcast responsive to a temporal change meeting a threshold value;
      analyzing an aesthetic quality of the frames based on frame content parameters to determine a carbon output for the frames;
      training a multi-modal model with historical trends of carbon emissions per calendar time periods for the streaming media being broadcast based on the carbon output for the frames to obtain a trained multi-modal model;
      predicting, with the trained multi-modal model, an upcoming carbon footprint as a streaming performance of content per frame for carbon units being produced from the streaming media; and
      adjusting, with the trained multi-modal model, the frames into carbon-aware frames by optimizing the carbon units produced by the frames based on user streaming characteristics and the aesthetic quality of the frames to match the target carbon footprint of the selected streaming plan and the upcoming carbon footprint in real time including reducing resolution for images including only black and white text, and increasing resolution for images of motion and color images.

2. The computer-implemented method of claim 1, wherein the at least one streaming plan includes a type of devices on which streaming media can be viewed.

3. The computer-implemented method of claim 1, wherein the at least one streaming plan includes a number of devices on which streaming media can be viewed.

4. The computer-implemented method of claim 1, wherein the at least one streaming plan includes a resolution for the streaming media to be viewed.

5. The computer-implemented method of claim 1, wherein maximizing the streaming performance further comprises selecting a quality for image resolution selected from a group consisting of standard definition, high definition, full high definition, and 4K.

6. A system for optimizing streaming media comprising:
   a hardware processor; and
   a memory that stores a computer program product, which, when executed by the hardware processor, causes the hardware processor to:
   analyze a streaming history of a streaming subscription to determine a historical carbon footprint;
   train a neural network to forecast an upcoming carbon footprint based on the historical carbon footprint by matching search items extracted from user requirements and source code stored in repositories to obtain a trained neural network;
   present, using the trained neural network, at least one streaming plan includes a target carbon footprint relative to the upcoming carbon footprint;
   receive a selected streaming plan for one of the at least one streaming plan having a target carbon emissions, wherein a streaming performance on the selected streaming plan is tracked for post streaming plan carbon emissions in carbon unit of measure;
   maximize the streaming performance and minimize the carbon emissions using multi-objective optimization during streaming by dynamically modifying the streaming performance including:
      divide content being broadcast into frames by performing video segmentation of the content being broadcast responsive to a temporal change meeting a threshold value;
      analyze an aesthetic quality of the frames based on frame content parameters to determine a carbon output for the frames;
      train a multi-modal model with historical trends of carbon emissions per calendar time periods for the streaming media being broadcast based on the carbon output for the frames to obtain a trained multi-modal model;
      predict, with the trained multi-modal model, an upcoming carbon footprint as a streaming performance of content per frame for carbon units being produced from the streaming media; and
      adjust, with the trained multi-modal model, the frames into carbon-aware frames by optimizing the carbon units produced by the frames based on user streaming characteristics and the aesthetic quality of the frames to match the target carbon footprint of the selected streaming plan and the upcoming carbon footprint in real time including reducing resolution for images including only black and white text, and increasing resolution for images of motion and color images.

7. The system of claim 6, wherein the at least one streaming plan includes a type of devices on which streaming media can be viewed.

8. The system of claim 6, wherein the at least one streaming plan includes a number of devices on which streaming media can be viewed.

9. The system of claim 6, wherein the at least one streaming plan includes a resolution for the streaming media to be viewed.

10. The system of claim 6, wherein maximizing the streaming performance further comprises selecting a quality for image resolution selected from a group consisting of standard definition, high definition, full high definition, and 4K.

11. A computer program product for optimizing streaming media comprising a computer readable storage medium having computer readable program instructions embodied therewith, the program instructions executable by a processor to cause the processor to:

analyze, using the processor, a streaming history of a streaming subscription to determine a historical carbon footprint of a user's streaming history;

train a neural network to forecast an upcoming carbon footprint based on the historical carbon footprint by matching search items extracted from user requirements and source code stored in repositories to obtain a trained neural network;

produce, using the trained neural network, at least one streaming plan includes a target carbon footprint relative to the upcoming carbon footprint;

receive, using the processor, a selected streaming plan for one of the at least one streaming plan having a target carbon emissions, wherein a streaming performance on the selected streaming plan is tracked for post streaming plan in carbon unit of measure;

maximize the streaming performance and minimize the carbon emissions using multi-objective optimization during streaming by dynamically modifying the streaming performance including:

divide content being broadcast into frames by performing video segmentation of the content being broadcast responsive to a temporal change meeting a threshold value;

analyze an aesthetic quality of the frames based on frame content parameters to determine a carbon output for the frames;

train a multi-modal model with historical trends of carbon emissions per calendar time periods for the streaming media being broadcast based on the carbon output for the frames to obtain a trained multi-modal model;

predict, with the trained multi-modal model, an upcoming carbon footprint as a streaming performance of content per frame for carbon units being produced from the streaming media; and adjust, with the trained multi-modal model, the frames into carbon-aware frames by optimizing the carbon units produced by the frames based on the user streaming characteristics and the aesthetic quality of the frames to match the target carbon footprint of the selected streaming plan and the upcoming carbon footprint in real time including reducing resolution for images including only black and white text, and increasing resolution for images of motion and color images.

12. The computer program product of claim 11, wherein the at least one streaming plan includes a type of devices on which streaming media can be viewed.

13. The computer program product of claim 11, wherein the at least one streaming plan includes a number of devices on which streaming media can be viewed.

14. The computer program product of claim 11, wherein the at least one streaming plan includes a resolution for the streaming media to be viewed.

15. The computer program product of claim 11, wherein maximizing the streaming performance further comprises selecting a quality for image resolution selected from a group consisting of standard definition, high definition, full high definition, and 4K.

16. The computer-implemented method of claim 1, wherein the frame content parameters include content information, object dynamics, and personalization.

17. The system of claim 6, wherein the user streaming characteristics includes streaming quality, device type for viewing streaming media being broadcast as a function of low carbon producing standard definition content or high carbon producing high definition content for the post streaming plan carbon emissions, network type, streaming duration.

18. The computer program product of claim 11, wherein analyzing the aesthetic quality further comprises detecting pixel-wise objects that depict movement in the frames.

\* \* \* \* \*